(12) United States Patent
Flueckiger et al.

(10) Patent No.: US 9,829,919 B2
(45) Date of Patent: Nov. 28, 2017

(54) PROTECTIVE COVER FOR AN INPUT DEVICE

(71) Applicant: Logitech Europe S.A., Lausanne (CH)

(72) Inventors: Jean-Marc Flueckiger, Causeway Bay (HK); Chun-Wei Su, Taipei (TW); Yibo Shao, Tsuen Wan (HK)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 15/259,933

(22) Filed: Sep. 8, 2016

(65) Prior Publication Data

US 2017/0075385 A1 Mar. 16, 2017

Related U.S. Application Data

(60) Provisional application No. 62/217,628, filed on Sep. 11, 2015.

(51) Int. Cl.
*G06F 1/16* (2006.01)
*A45C 11/00* (2006.01)
*G06F 1/18* (2006.01)
*A45C 15/00* (2006.01)

(52) U.S. Cl.
CPC ............ *G06F 1/1632* (2013.01); *A45C 11/00* (2013.01); *A45C 15/00* (2013.01); *G06F 1/169* (2013.01); *G06F 1/1626* (2013.01); *G06F 1/1688* (2013.01); *G06F 1/181* (2013.01); *A45C 2011/003* (2013.01); *A45C 2200/15* (2013.01)

(58) Field of Classification Search
CPC .... G06F 1/1626; G06F 1/1632; G06F 1/1656; G06F 2200/1633; G06F 2200/1634; H04B 1/3888
See application file for complete search history.

(56) References Cited

U.S. PATENT DOCUMENTS

| | | | | |
|---|---|---|---|---|
| 2013/0235521 | A1* | 9/2013 | Burch | G06F 1/1635 361/679.48 |
| 2014/0138275 | A1* | 5/2014 | Magnusson | B65D 85/00 206/459.1 |
| 2015/0373440 | A1* | 12/2015 | Fontana | H04R 1/025 381/388 |
| 2017/0163304 | A1* | 6/2017 | Cha | H04B 1/3888 |

* cited by examiner

*Primary Examiner* — Anthony Q Edwards
(74) *Attorney, Agent, or Firm* — Kilpatrick Townsend & Stockton LLP

(57) ABSTRACT

In some embodiments, a cover for a mobile electronic device includes a rectangular housing with a sleeve formed in a front side of the housing, the sleeve operable to receive the mobile electronic device, and a slot formed in a top side of the housing and spanning at least a portion of a distance from a left side to a right side of the housing. The slot may receive and support the mobile electronic device in an upright configuration and at an angle relative to the housing. The housing may be comprised of a rigid material covered with a soft material including one of a neoprene, cloth, or polypropylene material. The slot may include a first ring insert surrounding an opening of the slot, and the sleeve may include a second ring insert surrounding the opening of the sleeve.

20 Claims, 6 Drawing Sheets

PROTECTIVE COVER FOR AN INPUT DEVICE

CROSS-REFERENCES TO RELATED APPLICATIONS

This application is a non-provisional application and claims the benefit and priority of U.S. Provisional Application No. 62/217,628, filed on Sep. 11, 2015, and titled "Protective Cover for an Input Device," which is hereby incorporated by reference in its entirety for all purposes.

BACKGROUND

As mobile computing devices have become more commonplace in modern culture, more accessories are being developed to both enhance and protect them. Some accessories include protective carrying cases that protect the mobile computing device during transport, including folios, cases, and the like. Other accessories include picture frame-type stands that hold the mobile computing device in an upright configuration to present the user with a comfortable viewing angle. The various accessories can be useful, but tend to be cumbersome as carrying multiple accessories along with the mobile computing device is typically not preferred. Better designs are needed in this regard.

BRIEF SUMMARY

In certain embodiments, a case for a mobile computing device, such as a tablet computer, can have a sleeve on one side for snuggly inserting the tablet inside the case. The case can also have a slot on one surface to form a stand, so that the mobile computing device can be removed and supported by the slot in a number of different upright configurations. Some embodiments may include additional accessories (e.g., speakers, headphone jacks, etc.) and additional functionality, as further discussed below.

In some embodiments, a protective cover for a mobile electronic device can include a rectangular housing having a top side, a bottom side, a front side, a back side, a left side, and a right side, where the front side and back side may be longer than the left side and right side. A sleeve can be formed in the front side of the housing to receive and envelop the mobile electronic device. A slot may be formed in the top side of the housing and may span at least a portion of a distance from the left side to the right side of the housing. The slot may be operable to receive and support the mobile electronic device in an upright configuration and at an angle relative to the housing. The housing may be comprised of a rigid material (e.g., metal, plastic, etc.) and covered with a soft material that may include, for example, neoprene, cloth, or a polypropylene material. The mobile electronic device can be a smart phone, tablet computer, tablet, or other similarly dimensioned electronic device.

The slot can include a first ring insert forming an opening to the slot, the first ring insert being contoured to support the mobile electronic device in the slot at the angle relative to the housing. The sleeve can include a second ring insert forming an opening to the sleeve. In some cases, the slot may include a first section having a first width to support a first type of the mobile electronic device, and a second section having a second width to support a second type of the mobile electronic device. For example, the first width may be wider to support a tablet computer and a second type may be narrower to support a smart phone. In further embodiments, the slot can include a first section having a first width to support the mobile electronic device in an upright portrait configuration, and a second section having a second width to support the mobile electronic device in an upright landscape configuration. For example, the first width may be wider than the second width, such that the mobile electronic device leans further back in a more inclined angle in an upright portrait configuration, and the mobile electronic device leans at a steeper angle relative to the housing in a landscape configuration.

The slot may include a front portion of the slot closest to the front side of the housing that is angled to support the mobile electronic device in a rear facing configuration toward the back side of the housing. The slot may further include a back portion of the slot closest to the back side of the housing that is angled to support the mobile electronic device in a front facing configuration toward the front side of the housing. The front portion and the back portion of the slot may have different angles. The slot may contain multiple ridges therein to support the mobile electronic device at differing angles. The slot may be over-molded with a rubberized compound to increase a friction between the slot and the mobile electronic device. The rubberized compound can be a silicon-based rubber, which may be co-molded on top of the housing that is formed of a rigid structure (e.g., aluminum).

In some embodiments, the slot may be contoured to support the mobile electronic device in both a 65-degree angle relative to the top surface of the housing or a 72 degree angle relative to the top surface of the housing, although any suitable contours and corresponding angles may be used. The slot may include interior walls to provide support to the mobile electronic device when the mobile electronic device is placed in the slot. The interior walls may be comprised of at least one of a compressible material, a series of rubber fins, foam rubber, or the like. A ribbon can be coupled to an interior portion of the sleeve to assist in a removal of the mobile electronic device from the sleeve.

In certain embodiments, the protective cover can further include a printed circuit board (PCB), a processor coupled to the PCB, a speaker coupled to the PCB, the speaker controlled by the processor, and a set of controls disposed on the housing and coupled to the PCB to control the speaker. A cable may be coupled to the PCB to receive power from an external power source and provide the power to the PCB (thereby powering components electrically coupled to the PCB. In some implementations, the cover can further include an energy storage device coupled to the PCB to provide power to the PCB. The housing can further include one or more accessories including at least one of a keyboard integrated on the top surface of the housing, a trackpad integrated on the top surface of the housing, or a set of game controls integrated on the housing, where each of the one or more accessories can be powered by the energy storage device.

In certain embodiments, a cover for a tablet computer includes a housing, a sleeve forming an enclosure within the housing, where the sleeve is operable to receive and envelop the tablet computer, and a slot formed in the housing to receive an edge of the tablet computer and support the tablet computer in an upright configuration. In some cases, the cover can include a processor disposed in the housing and a keyboard disposed on the housing, where the keyboard can be controlled by the processor, and the cover can be communicatively coupled (e.g., hardwired or wirelessly coupled) to the tablet computer when the tablet computer is in the slot. The cover can further include an energy storage device to power the processor and keyboard.

BRIEF DESCRIPTION OF THE DRAWINGS

The detailed description is set forth with reference to the accompanying figures.

DETAILED DESCRIPTION

Aspects of the invention relate generally to protective covers for mobile electronic devices including tablet computers, mobile phones, and other similarly dimensioned computing devices.

In the following description, various embodiments of a protective cover will be described. For purposes of explanation, specific configurations and details are set forth in order to provide a thorough understanding of the embodiments. However, it will be apparent to one skilled in the art that certain embodiments may be practiced without every disclosed detail. Furthermore, well-known features may be omitted or simplified in order not to obscure the embodiments described herein.

In certain embodiments, a protective cover for a mobile electronic device (e.g., a tablet computer, tablet, smart phone, etc.) includes a housing having a sleeve to receive and envelop the mobile electronic device to provide protection and function as a useful carrying case. The housing can include a slot (e.g., on the top) to receive the mobile electronic device and support it in a variety of upright configurations (e.g., forwards or backwards) and at different angles. Thus, certain embodiments provide a multi-purpose cover that functions as a protective cover, a carrying case, and a device stand, all in a sturdy, convenient, and compact design. For simplicity, a tablet computer is referred to herein, but it is understood that any mobile electronic device could be substituted for the tablet.

Figure 1:
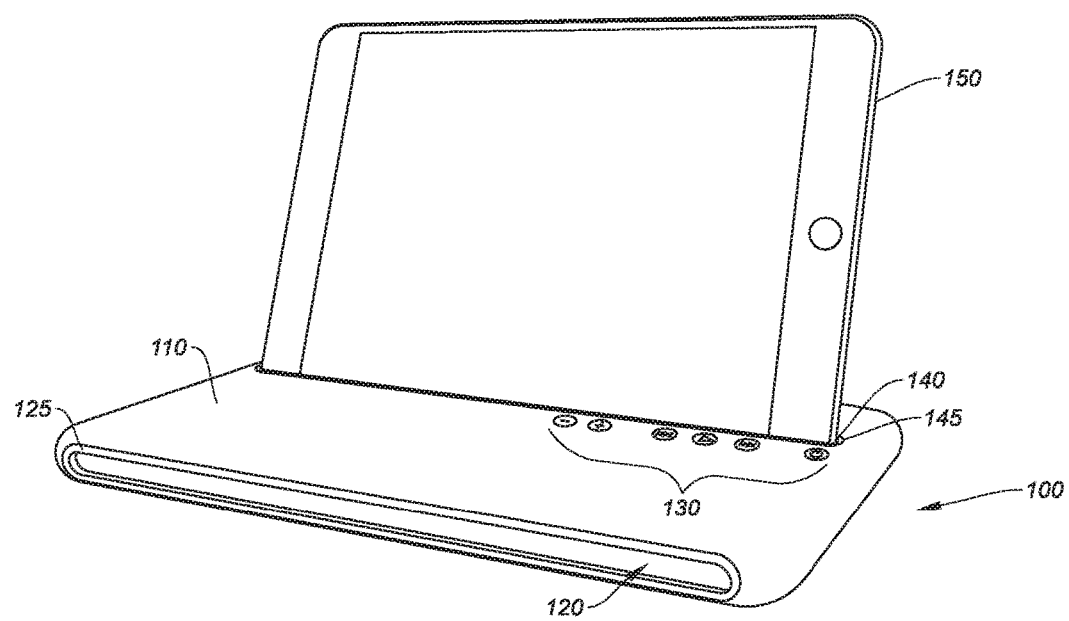
FIG. 1 is a diagram of a protective cover with a tablet in a slot disposed on a top side of the cover, according to certain embodiments.

FIG. 1 is a diagram of protective cover 100 with mobile electronic device 150 (e.g., tablet computer 150) in slot 140 that is disposed on a top side of protective cover 100, according to certain embodiments. Protective cover 100 can include housing 110, sleeve 120, sleeve ring 125, slot 140, slot ring 145, and media controls 130. Mobile electronic device 150 is shown to be disposed in slot 140.

In some embodiments, housing 110 can be comprised of any suitably sturdy material to provide ample protection to a mobile electronic device when it is secured inside sleeve 120. For instance, housing 110 can be comprised of one or more plastics, which may include Polyethylene Terephthalate (PET), High-Density Polyethylene (HDPE), Polyvinyl Chloride (PVC), Acrylonitrile Butadiene Styrene (ABS), hard rubber (e.g., silicon based, polyurethane, etc.), metal (e.g., aluminum, alloy, etc.) or other suitable material. In addition to providing a protective shell for mobile electronic device 150, the sturdy construction of housing 110 may further provide structural support to strengthen slot 140 and support mobile electronic device 150. Housing 110 can include multiple layers of varying materials (e.g., in addition to the hard rubber or plastic) for a variety of functions as further discussed below with respect to FIG. 4. Housing 110 can include a cavity formed therein to form sleeve 120 and slot 140. Housing 110 can be formed in any suitable shape (e.g., rectangle, square, rounded, etc.) and/or dimensions. In some embodiments, additional slots, sleeves, and/or media controls can be disposed on housing 110.

In certain embodiments, sleeve 120 can be formed on a side of housing 110, as shown in FIG. 1. Sleeve 120 defines an area within housing 110 that mobile electronic device 150 can slide into. Sleeve ring 125 can be configured around the opening that defines sleeve 120 to provide structural support. Sleeve ring 125 can be any suitable plastic, metal, or rubber material preferably having a low-friction surface for easier installation and removal of mobile electronic device 150 from sleeve 120. Sleeve ring 125 may also help sleeve 120 maintain its shape (provides support) and prevent collapse. In some implementations, sleeve 120 may not have a sleeve ring.

In some embodiments, sleeve 120 some flexibility at the sides of the sleeve to accommodate mobile electronic devices of different thickness, and/or ease insertion/removal thereof. For example, the sides of the opening of sleeve 120, and the interior, may be flexible and can either stretch or compress to accommodate different sized mobile electronic devices. In some cases, the interior walls of sleeve 120 (not shown) may be made of a soft material forming a series of corrugated channels to ease insertion and removal of mobile electronic device 150.

Slot 140 can be formed on a top surface of housing 110, according to certain embodiments. Slot 140 can include any suitable dimension (e.g., length, width, depth) and is typically used to support mobile electronic device 150 in one of a number of possible upright configurations. For instance, mobile electronic device 150 can be inserted into slot 140 in a forward-facing configuration (e.g., a display on mobile electronic device 150 faces the side of housing 110 with sleeve 120) or a backward-facing configuration (e.g., a display on mobile electronic device 150 faces the opposite side of housing 110 with sleeve 120). In some cases, slot 140 can support mobile electronic device 150 at multiple different angles (e.g., 65-75 degrees from surface of housing) to accommodate different user viewing preferences, as further discussed below with respect to FIGS. 5A-5B. Slot ring 145 can be any suitable plastic, metal, or rubber material preferably having a low-friction surface for easier installation and removal of mobile electronic device 150 from slot 140. Slot ring 145 may be angled to support mobile electronic device at an angle, as further discussed below. In some embodiments, slot 140 may not have a slot ring 145. In some cases, slot 140 may span at least a portion of a distance from the left-side to the right-side of housing 110 (e.g., parallel to the opening of sleeve 120). For instance, slot 140 may span at least 90% of the distance from the left-side to the right-side of housing 110.

In some embodiments, the angle of slot 140 and/or slot ring 145 can be different in the middle or on one side, so that mobile electronic device 150 can be rotated from a landscape position to a portrait position, and be supported at a different angle. In such embodiments, a shorter edge of the mobile electronic device 150 can thus, in portrait orientation, contact only the portion of slot 140 at the middle or one side that is at a different angle, as further discussed below. In some embodiments, the location of slot 140 can be about ⅓ of the distance from the back of the cover, which can allow protective cover 400 support mobile electronic device 150 without tipping while on a user's lap or another surface. In some implementations, interior walls of slot 140 can be made of a compressible material, such as a series of extending rubber fins, foam rubber, etc., to allow the accommodation of tablet computers, smart phones, or other mobile electronic devices 150 of different widths.

In certain embodiments, slot 140 can be rubberized by including a co-molding silicon rubber disposed on top of an extruded aluminum structure. The silicon rubber can provide high friction (i.e., an improved coefficient of friction) to hold mobile electronic device 150 in place without moving or sliding upwards or laterally while positioned in rubberized slot 140.

Media controls 130 can include volume controls, media transport controls (e.g., play, pause, rewind, fast forward, pause, skip, etc.), power controls, and the like, and can be used to control various electronic functions of mobile electronic device 150, as further discussed below with respect to FIG. 3. Any type of controls can be implemented on mobile electronic device 150 including, but not limited to, communication controls (not shown) between mobile electronic device 150 and protective cover 100. For example, some communication controls can include a multi-host switch (e.g., switching a wireless connection between multiple mobile electronic devices), communication protocol selection (e.g., Bluetooth variants, ZigBee, Infra-red, etc.), communication medium selection (e.g., wireless vs. hardwired), or the like. In some embodiments, output devices (e.g., speakers, displays, etc.) and/or input devices (e.g., microphones, touch pads, etc.) can be integrated with protective cover 100 (e.g., embedded on housing 110), as further discussed below with respect to FIG. 3. One of ordinary skill in the art would understand the many variations, modifications, and alternative embodiments thereof.

Figure 2A:
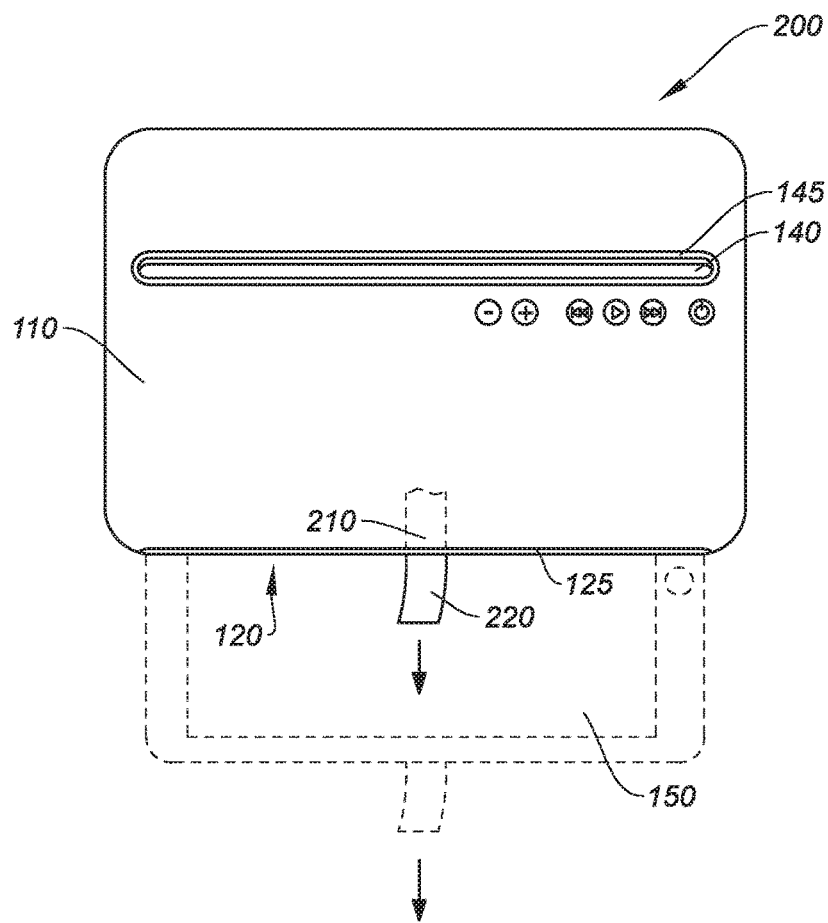
FIG. 2A is a diagram illustrating the removal of the tablet from the sleeve, according to certain embodiments.
Figure 2B:
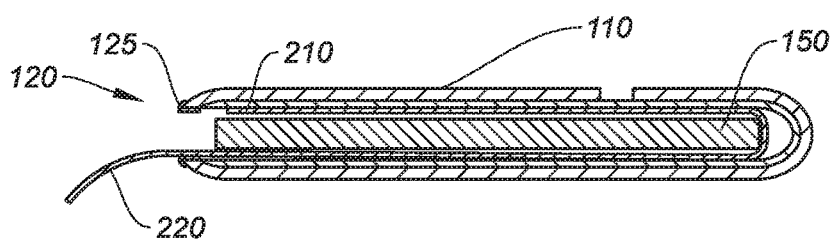
FIG. 2B is a diagram showing a side-view cutaway of the protective cover, according to certain embodiments.
Figure 2C:
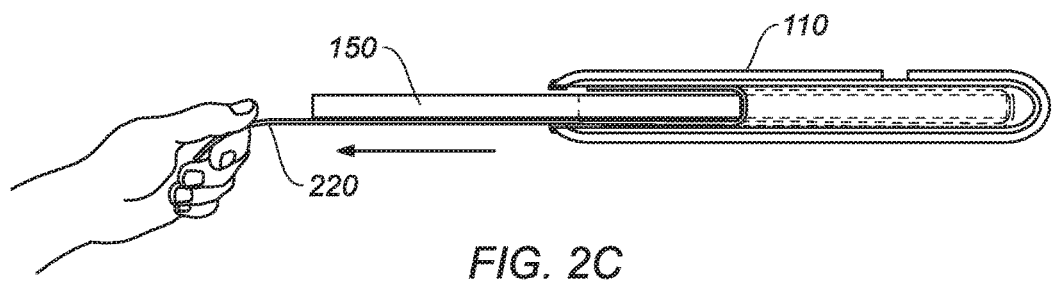
FIG. 2C is a diagram showing a side-view cutaway of the protective cover, according to certain embodiments.

FIG. 2A is a diagram showing the removal of mobile electronic device 150 from sleeve 120 of protective cover 200, according to certain embodiments. Protective cover 200 includes sleeve 120, sleeve ring 125, slot 140, slot ring 145, ribbon 220 and ribbon anchor point 210. Ribbon 220 can be attached to housing 110 at any suitable location besides (or in addition to) ribbon anchor point 210. Ribbon 220 can be configurable to (e.g., used to) remove mobile electronic device 150 from sleeve 120, similar to the ribbons that wrap under batteries to assist their removal from a battery case. FIGS. 2B and 2C depict a side view cutaway of protective cover 200 showing how mobile electronic device 150 can be inserted into and removed from sleeve 120 using ribbon 220. Ribbon 220 can be of any suitable length or width and may be placed in any suitable location on housing 110. In some implementations, ribbon 220 loops around the back side of mobile electronic device 150 and out the front of sleeve 120. The end of the ribbon can be secured around the front side of the tablet, to secure it within sleeve 120, and attached to a fastener (anchor point 210), such as a Velcro®, magnetic, or hardware-based fastener (e.g., pin, tab, staple, etc.). One of ordinary skill in the art would understand the many variations, modifications, and alternative embodiments thereof.

Figure 3:
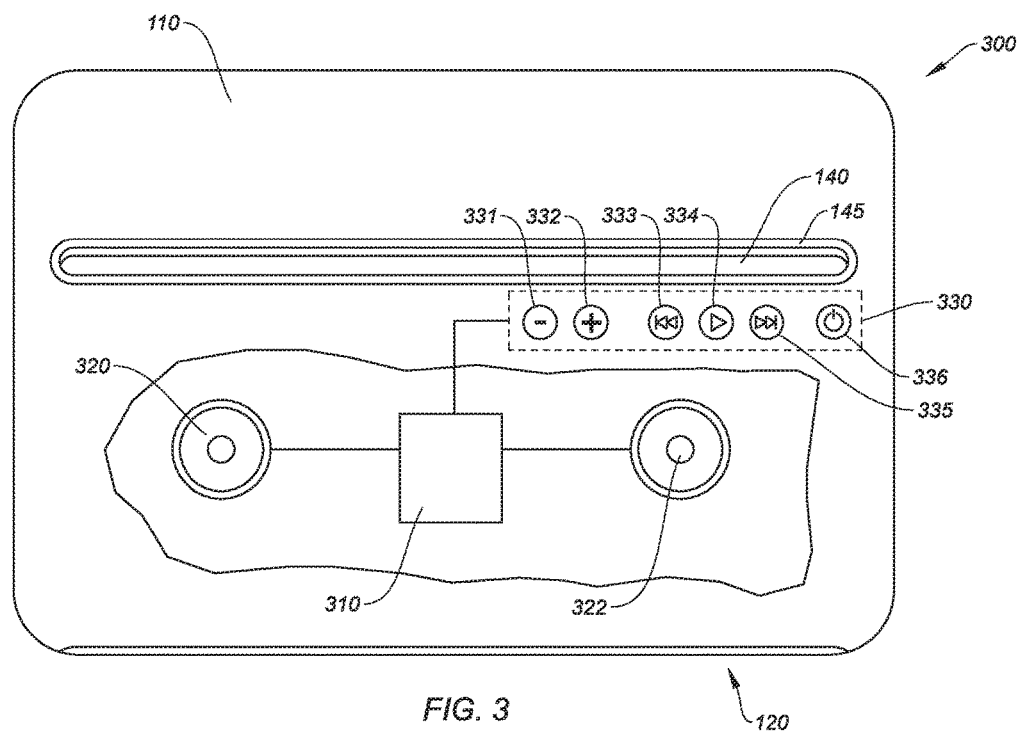
FIG. 3 is a diagram showing embedded speakers and corresponding media controls, according to certain embodiments.

FIG. 3 is a diagram showing embedded speakers 320, 322 and corresponding media controls 330 on protective cover 300, according to certain embodiments. Protective cover 300 includes housing 110, sleeve 120, sleeve ring 125, slot 140, slot ring 145, and media controls 330. Housing 110 is shown in a cutaway view to reveal underlying circuitry including speakers 320, 322 and processor 310, according to certain embodiments.

In some cases, speakers 320, 322 can be coupled to and controlled by processor 310. Speakers 320, 322 can be flat speakers. Media controls 330 can include volume controls 331, 332, play button 334, previous track 333, next track 335, and power button 336. Any type of media controls can be included including fast forward, rewind, and the like. Protective cover 300 can further include communication controls including, but not limited to multi-host switching, wireless protocol selection, communication medium selection, or the like. In some embodiments, output devices (e.g., speakers, displays, etc.) and/or input devices (e.g., microphones, touch pads, etc.) can be integrated with protective cover 300 (e.g., embedded on housing 110), which may be controlled by processor 310. One of ordinary skill in the art would understand the many variations, modifications, and alternative embodiments thereof.

In certain embodiments, a printed circuit board (PCB) can be used in the various embodiments described herein. For instance, aspects of system 300 (or system 600) can be attached to, embedded on, or otherwise coupled to the PCB (not shown). The PCB can be rigid and disposed under a soft outer layer of protective cover 300. The soft outer layer may be a material that allows sound to exit relatively unimpeded (e.g., highly permeable), particular at locations near (e.g., above) speakers 320, 322.

Protective cover 300 can include one or more energy storage devices (e.g., batteries—not shown) embedded in housing 110, which can power processor 310, speakers 320, 322, and media controls 330. In some cases, protective cover 300 can include one or more interfaces (e.g., sockets, plugs, etc.) for charging the energy storage device (e.g., via wall transformer) and/or coupling the energy storage device to mobile electronic device 150 for communication and/or charging purposes.

Figure 4:
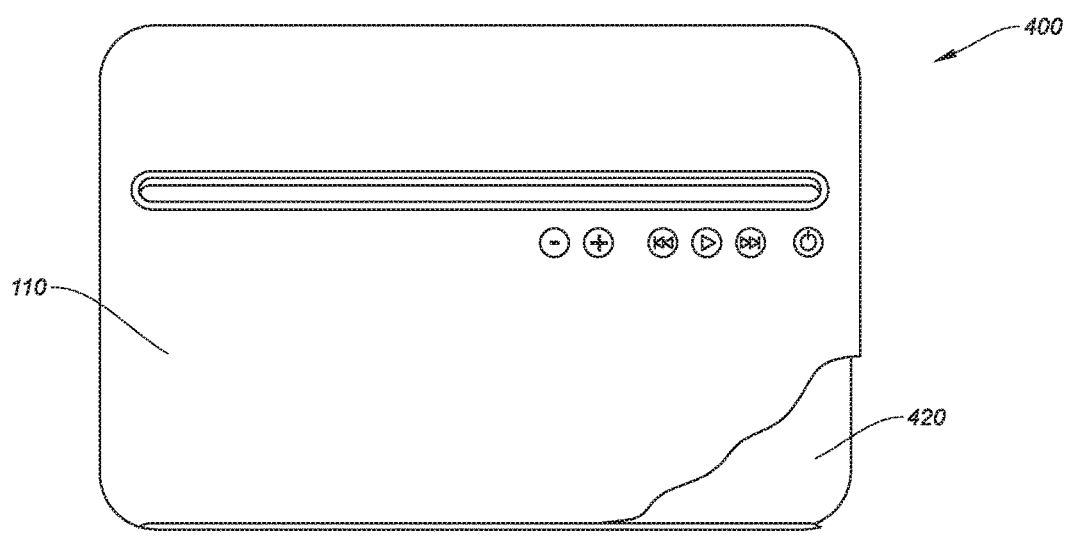
FIG. 4 is a diagram showing constructions details for the protective cover, according to certain embodiments.

FIG. 4 is a diagram showing construction details for protective cover 400, according to certain embodiments. Housing 110 can be monolithic (e.g., a single layer) or may be comprised of multiple layers. For instance, some embodiments may include a core layer 420 that provides weight, strength, and durability. Core layer 420 may be comprised of one or more plastics (e.g., PET, HDPE, PVC, ABS, etc.), rubber compounds (e.g., silicon-based, PU, etc.), or other suitable material.

Additional layers can be used to enhance functional and/or aesthetic features. For example, outer layer(s) (e.g., on the outside surface of core 420) can be added to improve the look and feel of protective cover 400. Some layers may include neoprene, foam rubber, a soft rubber compound, padding, polypropylene, or the like, to make the outer layer feel soft and pliable. The outer most layer can include any suitable material such as a textile (e.g., cotton), polyurethane, or the like, to achieve any desired appearance. In some embodiments, graphics, silk screening, etc., can be used. In some cases, a removable outer portion can be used to allow a user to customize the look and feel protective cover 400. For instance, a bright and colorful hard-surfaced outer layer can be swapped out for a darker, more color-muted cover with a soft surface.

In some embodiments, one or more inner layers (e.g., on the inside surface of core 420) can be used to improve frictional properties of sleeve 120. For instance, a low-friction material (e.g., plastic, textile, rubber, etc.) can make the insertion and removal of mobile electronic device 150 an easier process. Some embodiments may use materials with non-abrasive properties to prevent damage to mobile electronic device 150.

Figure 5A:
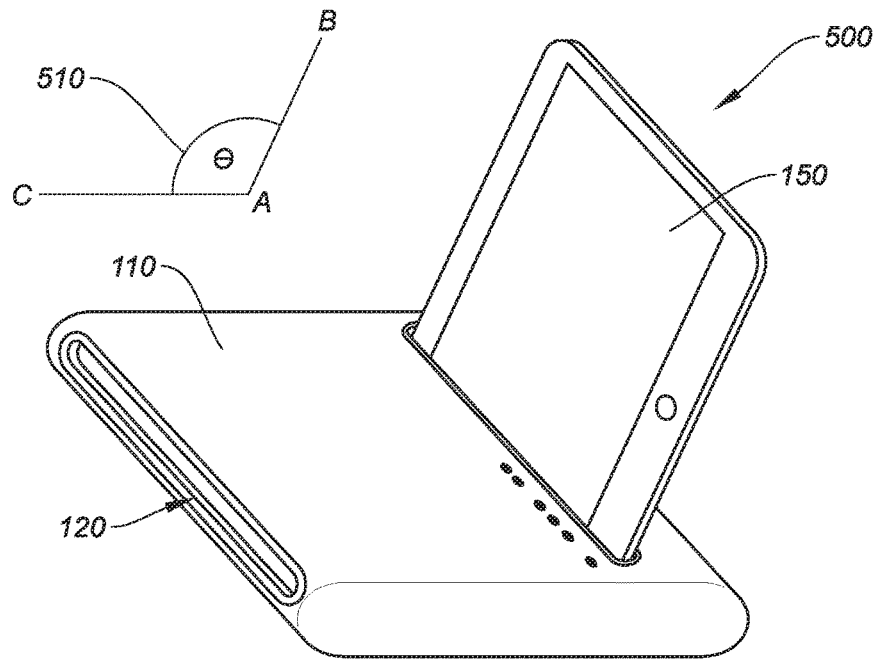
FIG. 5A shows a tablet computer disposed in the slot in a forward-facing upright configuration, according to certain embodiments.

FIG. 5A shows mobile electronic device 150 disposed in slot 140 in a forward-facing upright configuration, according to certain embodiments. Slot 140 may include certain structural features (e.g., multiple ledges, protrusions, etc.) that can allow mobile electronic device 150 to rest in slot 140 in multiple forward-facing upright configurations, each having a different angle θ. Referring to FIG. 5A, mobile electronic device 150 is leaning back towards the back of protective cover 400 (e.g., on the opposite side of sleeve 120) at a 70 degree angle. Slot 140 can be designed to support mobile electronic device 150 at any suitable angle.

Figure 5B:
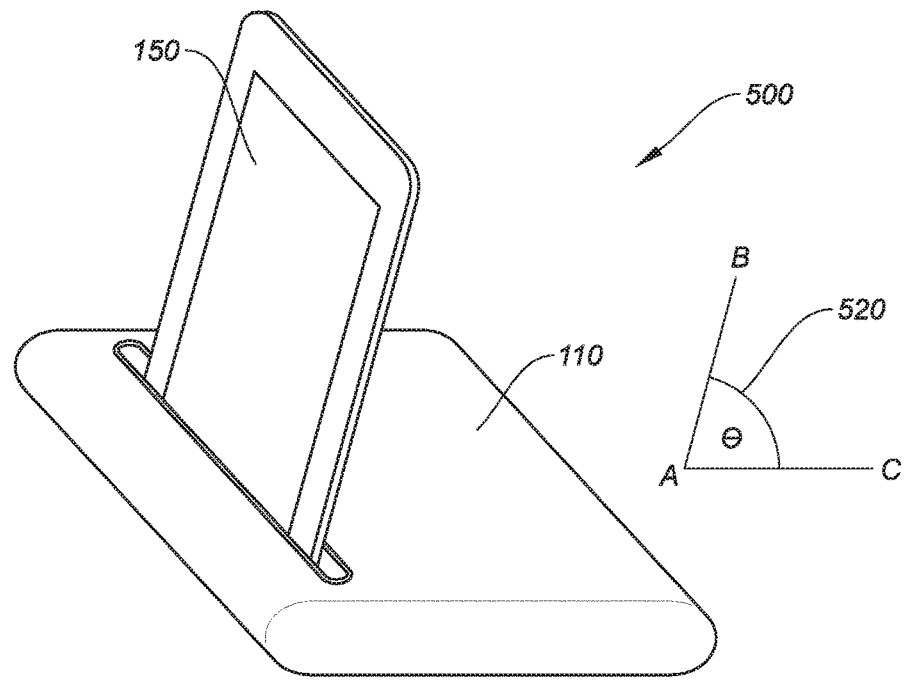
FIG. 5B shows a tablet computer disposed in the slot in a rear-facing upright configuration, according to certain embodiments.

FIG. 5B shows mobile electronic device 150 disposed in slot 140 in a rear-facing upright configuration, according to certain embodiments. Slot 140 can include additional structural features that can allow mobile electronic device 150 to rest in slot 140 in multiple rear-facing upright configurations, each having a different angle θ. Referring to FIG. 5B, mobile electronic device 150 is leaning back towards the back of protective cover 400 (e.g., on the opposite side of sleeve 120) at a 70 degree angle. Slot 140 can be designed to support mobile electronic device 150 at any suitable angle. In some embodiments, the configuration of mobile electronic device 150 can control certain electronic configurations of protective cover 500. For instance, media controls 130 may be automatically disabled (e.g., by processor 310) in response to detecting that mobile electronic device 150 is placed in slot 140 in a rear-facing configuration because media controls 130 may not be easily accessible by a user in that particular configuration and disabling media control 130 may help conserve battery power.

In certain embodiments, a portrait mode (shown in FIG. 5B) may be supported at a steeper angle (e.g., closer to vertical), while a landscape mode (shown in FIG. 5A) can be supported at less of an angle. In some cases, the front and/or back sidewalls of slot 140 have different angles, to support the tablet at different angles when facing forward or backward.

In some embodiments, alternate mechanisms can be used to provide different desired angles. For instance, the inside bottom of housing 110 can have multiple ridges for supporting mobile electronic device 150 at different angles. In another example, the width of slot 140 may be different for the landscape and portrait portions to provide the desired different angles.

In some embodiments, slot 140 can be rubberized (overmolded with rubber) for an improved friction to better keep mobile electronic device 150 in a rear-facing and active upright configuration (e.g., without sliding out). Rubberized slot 140 (not specifically shown) can be designed and/or configured to support mobile electronic device 150 at any suitable viewing angle or multiple viewing angles based on the shape, depth, width, materials, etc. In some embodiments, mobile electronic device 150 can be supported upright at a 65 or 72 degree in either portrait or landscape configurations in the forward facing and/or rear facing configurations. The specific angles are intended to provide practical examples for reference. It should be understood that any suitable angle can be used that can be the same or different from a forward-facing configuration versus a backward-facing configuration.

In further embodiments, multiple slots may be implemented and can be aligned in any suitable arrangement (e.g., longitudinally, latitudinally, diagonally, etc.). Certain embodiments include at least a forward-facing upright configuration such that mobile electronic device 150 faces the front portion of protective cover 100, and at least a backward-facing upright configuration such that the electronic device faces the back portion.

Figure 6:
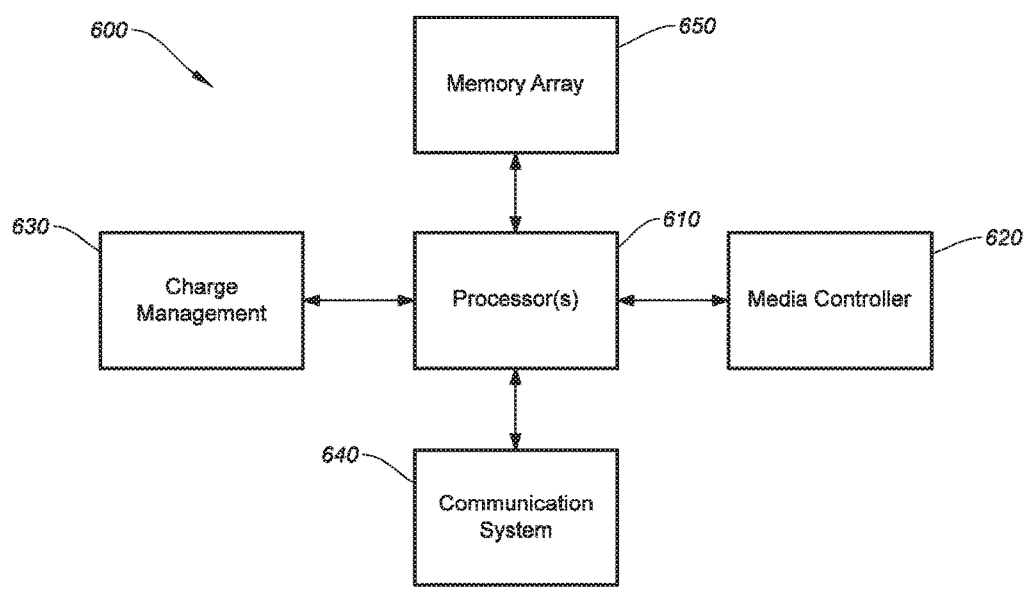
FIG. 6 is a system diagram for the protective cover, according to certain embodiments.

FIG. 6 is a simplified block diagram of system 600 configured to operate protective cover 100, according to certain embodiments. System 600 can include processor(s) 610, media controller 620, charge management system 630, communication system 640, and memory array 650. Each of system blocks 620-650 can be in electrical communication with processor(s) 610. System 600 may include more or fewer systems, as would be appreciated by one of ordinary skill in the art, and are not shown or discussed to prevent obfuscation of the novel features described herein. System blocks 620-650 may be implemented as separate modules, or alternatively, two or more system blocks may be combined in a single module. For instance, some or all of system blocks 620-650 may be subsumed by processor(s) 610. System 600 and variants thereof can be used to operate the protective covers described and depicted (FIGS. 1-5B) throughout this disclosure.

In certain embodiments, processor(s) 610 may include one or more microprocessors (μCs) and may control the operation of system 600. Alternatively, processor(s) 610 may include one or more microcontrollers (MCUs), digital signal processors (DSPs), or the like, with supporting hardware and/or firmware (e.g., memory, programmable I/Os, etc.), as would be appreciated by one of ordinary skill in the art. In some embodiments, processor(s) 610 may be configured to control aspects of charging controls, media controls, and the like.

Media controller 620 may be configured to control the media controls 130 shown in at least FIGS. 1-5A, according to certain embodiments. Alternatively or additionally, media controls may be controlled wholly or in part by processor(s) 610. Some non-limiting examples of possible media controls include volume control, transport controls (e.g., play, rewind, fast-forward, stop, pause), power on/off, charging on/off, communication (e.g., Bluetooth) on/off, or the like.

Memory array 650 can store information such as charging profiles, media control parameters, communication parameters, or the like. Memory array 650 may store one or more software programs to be executed by processors (e.g., processor(s) 610). It should be understood that "software" can refer to sequences of instructions that, when executed by processor(s), cause system 600 to perform certain operations of software programs. The instructions can be stored as firmware residing in read-only memory (ROM) and/or applications stored in media storage that can be read into memory for processing by processing devices (processor(s) 610). Software can be implemented as a single program or a collection of separate programs and can be stored in non-volatile storage and copied in whole or in-part to volatile working memory during program execution. Memory array 650 can include random access memory (RAM), read-only memory (ROM), long term storage (e.g., hard drive, optical drive, etc.), and the like, as would be understood by one of ordinary skill in the art.

Charge management system 630 can be configured to manage power distribution between systems (blocks 610-

650), charging operations, power efficiency, and the like, for protective covers 100-500. In some embodiments, charge management system 630 can include one or more batteries (not shown), a recharging system for the battery (e.g., USB cable—not shown), power management devices (e.g., low-dropout voltage regulators—not shown), or the like. In certain embodiments, the functions provided by charge management system 630 may be incorporated into processor(s) 610. An energy storage device can be any suitable rechargeable energy storage device including, but not limited to, NiMH, NiCd, lead-acid, lithium-ion, lithium-ion polymer, and the like. Energy storage devices may charge a mobile electronic device via a cable (e.g., USB cable), or inductive power coupling. The recharging system can include an additional cable (specific for the recharging purpose) or it can use the mobile electronic device's socket (e.g., coupled to a computer, power adapter, etc.) to recharge the energy storage device.

Communication system 640 can be configured to provide wireless communication between protective cover 100 and mobile electronic device 150. Some non-limiting examples of communication between protective cover 100 and mobile electronic device 150 can include media control operations, charging operations, communicating status updates including battery charge capacity, state-of-charge, charging/discharging rate, etc. Communications system 640 can be configured to provide radio-frequency (RF), Bluetooth, infra-red, ZigBee, or other suitable communication protocol to communicate with other wireless devices. System 600 may optionally comprise a hardwired connection to mobile electronic device 150. For example, energy storage device 170 can be configured to receive a Universal Serial Bus (USB) cable to enable bi-directional electronic communication with mobile electronic device 150 or other external devices via a socket (not shown). Some embodiments may utilize different types of cables or connection protocol standards to establish hardwired communication with other entities.

Although certain necessary systems may not expressly discussed, they should be considered as part of system 600, as would be understood by one of ordinary skill in the art. For example, system 600 may include a bus system to transfer power and/or data to and from the different systems therein.

It should be appreciated that system 600 is illustrative and that variations and modifications are possible. System 600 can have other capabilities not specifically described herein. Further, while system 600 is described with reference to particular blocks (610-650), it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks may or may not be reconfigurable depending on how the initial configuration is obtained.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A protective cover for a mobile electronic device, the protective cover comprising:
    a rectangular housing including:
        a top side;
        a bottom side;
        a front side;
        a back side;
        a left side; and
        a right side,
        wherein the front side and back side are longer than the left side and right side;
    a sleeve formed in the front side of the housing, the sleeve configured to receive the mobile electronic device; and
    a slot formed in the top side of the housing and spanning at least a portion of a distance from the left side to the right side of the housing, the slot configured to receive and support the mobile electronic device in an upright configuration and at an angle relative to the housing.

2. The cover of claim 1 wherein the housing is comprised of a rigid material covered with a soft material including one of a neoprene, cloth, or polypropylene material.

3. The cover of claim 1 wherein the slot includes a first ring insert forming an opening to the slot, and wherein the sleeve includes a second ring insert forming an opening to the sleeve.

4. The cover of claim 3 wherein the first ring insert is contoured to support the mobile electronic device in the slot at the angle relative to the housing.

5. The cover of claim 1 wherein the slot includes:
    a first section having a first width to support a first type of the mobile electronic device; and
    a second section having a second width to support a second type of the mobile electronic device.

6. The cover of claim 1 wherein the slot includes:
    a first section having a first width to support the mobile electronic device in an upright portrait configuration; and
    a second section having a second width to support the mobile electronic device in an upright landscape configuration.

7. The cover of claim 1 wherein the slot includes:
    a front portion of the slot closest to the front side of the housing, the front portion angled to support the mobile electronic device in a rear facing configuration toward the back side of the housing; and
    a back portion of the slot that is closest to the back side of the housing, the back portion angled to support the mobile electronic device in a front facing configuration toward the front side of the housing, wherein the front portion and the back portion having different angles.

8. The cover of claim 1 wherein the slot contains multiple ridges therein to support the mobile electronic device at differing angles.

9. The cover of claim 1 wherein the slot is over-molded with a rubberized compound to increase a friction between the slot and the mobile electronic device.

10. The cover of claim 9 wherein the rubberized compound is a silicon-based rubber, and wherein the silicon-based rubber is co-molded on top of the housing formed of an extruded aluminum structure.

11. The cover of claim 1 wherein the slot in contoured to support the mobile electronic device in both a 65-degree angle relative to a top surface of the top side of housing or a 72-degree angle relative to the top surface of the top side of the housing.

12. The cover of claim 1 wherein the slot includes interior walls, and wherein the interior walls are comprised of at least one of:
   a compressible material;
   a series of rubber fins; or
   a foam rubber,
   wherein the interior walls provide support to the mobile electronic device.

13. The cover of claim 1 further comprising a ribbon coupled to the sleeve, the ribbon configurable to assist in a removal of the mobile electronic device from the sleeve.

14. The cover of claim 1 further comprising:
   a printed circuit board (PCB);
   a processor coupled to the PCB;
   a speaker coupled to the PCB, the speaker controlled by the processor; and
   a set of controls disposed on the housing, the set of controls coupled to the PCB, the set of controls to control the speaker.

15. The cover of claim 14 further comprising a cable coupled to the PCB to receive power from an external power source and provide the power to the PCB.

16. The cover of claim 14 further comprising an energy storage device coupled to the PCB, the energy storage device to provide power to the PCB.

17. The cover of claim 16 wherein the housing further comprises one or more accessories including at least one of:
   a keyboard integrated on a top surface of the top side of the housing;
   a trackpad integrated on the top surface of the top side of the housing; or
   a set of game controls integrated on the top surface of the top side of the housing,
   wherein each of the one or more accessories are powered by the energy storage device.

18. A cover for a tablet computer comprising:
   a housing:
   a sleeve forming an enclosure within the housing, the sleeve configured to receive and envelop the tablet computer; and
   a slot formed in the housing to receive an edge of the tablet computer and support the tablet computer in an upright configuration.

19. The cover of claim 18 further comprising:
   a processor disposed in the housing; and
   a keyboard disposed on the housing, the keyboard controlled by the processor, and the cover communicatively coupled to the tablet computer when the tablet computer is in the slot.

20. The cover of claim 19 further comprising an energy storage device to power the processor and the keyboard.

* * * * *